Patented Apr. 5, 1932

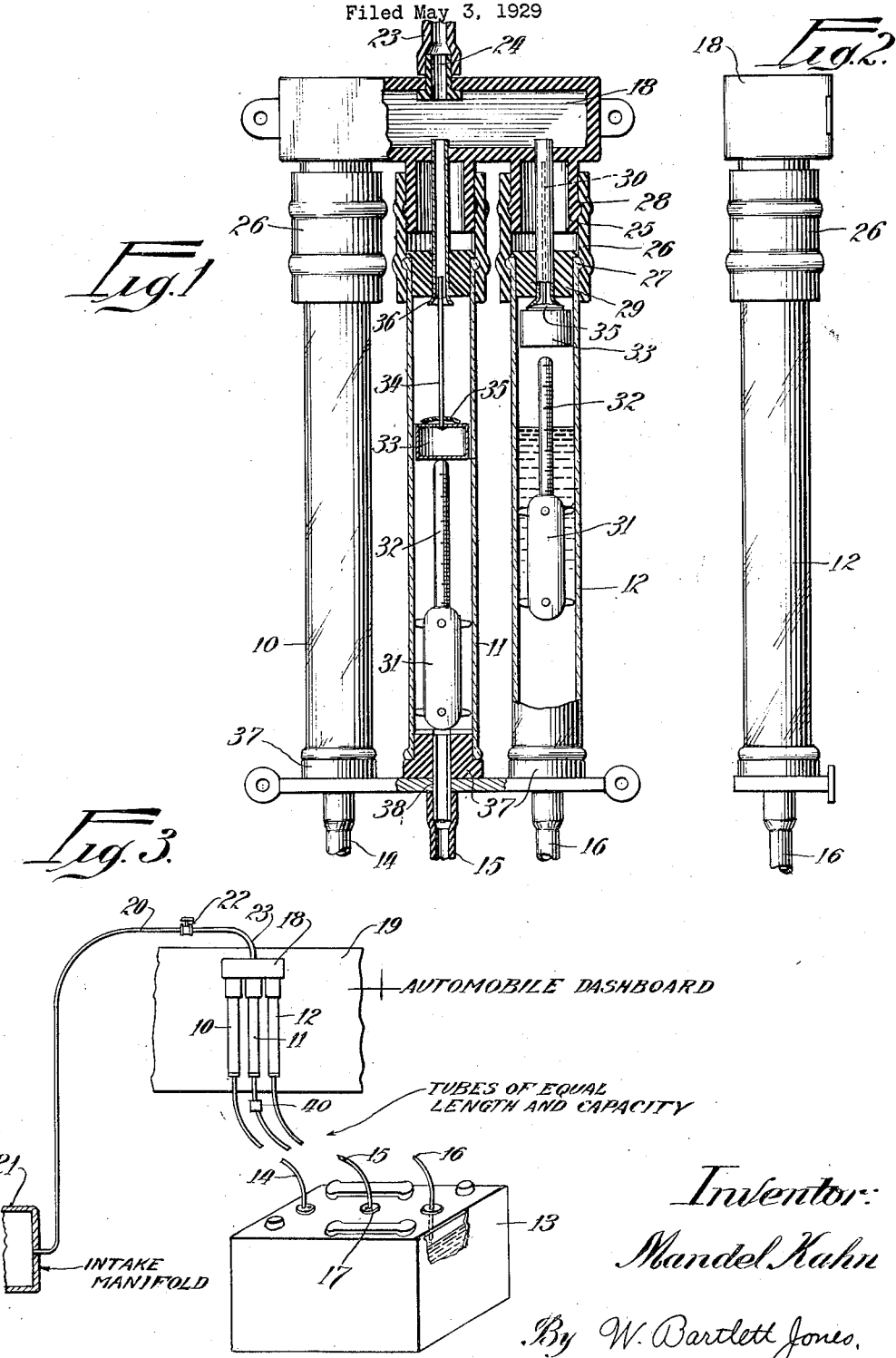

1,852,118

UNITED STATES PATENT OFFICE

MANDEL KAHN, OF CHICAGO, ILLINOIS

HYDROMETER

Application filed May 3, 1929. Serial No. 360,039.

The present invention relates generally to hydrometers and has special reference to automatic hydrometers, and in particular such a one as may be used on an instrument board.

The invention as herein shown and described is specially adaptable for use in automobiles and in such use provides a hydrometer, or a number of hydrometers, that may be mounted on the dash board of an automobile to draw into it battery acid for measuring its gravity.

The primary object of the invention is to provide a suction operated hydrometer which automatically fills itself to a desired level.

Another object of the invention is to provide a hydrometer for an automobile which my be operated by suction as from the intake manifold, and which will be automatically cut off from the suction to provide liquid at the proper level for the purpose of measurement.

Still another object of the invention is the provision of a hydrometer with a float therein capable of sealing off the suction which draws in the liquid.

Various other objects and advantages of the invention will become apparent from the following description of the embodiment thereof which is shown in the accompanying drawings for the purpose of illustrating the nature of the invention as it may be used in an automobile. In the drawings—

Fig. 1 represents an elevation of the device as it is ready to be mounted on the dash board of an automobile, being shown partly in section to illustrate the construction.

Fig. 2 is a fragmentary end view of the device.

Fig. 3 is a view showing how the device is operatively connected to a suction manifold and the battery of an automobile.

In an automobile the battery is usually quite inaccessible, necessitating the removal of seats or floor boards to get at it, and then necessitating the unscrewing of three caps to get at the acid contents to test the same. For this and for other reasons, owners, or caretakers, neglect to examine the battery as often as they should, and it frequently happens that the battery breaks down without warning. The battery may actually become injured from improper attention, or it may become discharged through excessive use, or an inadequate charging rate for the character of the driving. The only indication of the condition of the battery is the gravity of the acid. The present invention therefore aims to render it easy to test the acid, so that the condition of the battery as well as other parts of the automobile may be determined by the driver from his driving seat at any time.

In the drawings there is shown a set of three hydrometers, one for each cell of the standard battery, designated 10, 11 and 12, connected to the battery 13. Tubes 14, 15 and 16 of equal length and capacity, of rubber or of glass, or rubber connected glass, which materials are resistant to the acid, are shown extending from each hydrometer through cell caps 17 into the acid of the cells. The three hydrometer glasses are preferably connected to a common header 18 forming a unit which may be mounted on an instrument board such as the automobile dash board 19. A tube 20 is employed to establish connection with the suction manifold 21 of the automobile and may have an adjusting screw valve 22 to regulate the degree of suction. The parts 20, 21 and 22 may be found as standard equipment on some automobiles, provided specifically for the purpose of operating windshield cleaners. From such parts I may employ a tubular connection 23 to the header 18.

The header may comprise a box structure from one part of which a nipple projects, as indicated at 24, for connection of the tube 23. The header also has three alined nipples or rings of large size to which the hydrometer glasses 10, 11 and 12 are mounted. The nipples 25 are substantially the same size as the hydrometer tubes so that connecting means such as rubber tube sections 26 hold the two together, the glass having a retaining flange 27 and the nipple having a retaining ring 28.

The glass tube of each hydrometer is plugged with a fitting such as a rubber stopper 29 through which passes a tube 30 leading into the header 18 and providing a conduit for suction between the header and the hydrometer. In the hydrometer tube there is the usual liquid test float 31 with its calibrated spindle 32. Above the test float I illustrate another float, which is not essentially a liquid float, but is rather a part connected with a valve member adapted to be moved to operate a valve associated with tube 30. In the present instance it is called an air float to distinguish it from the liquid test float. It is a light weight member which fairly well fills the inside of the tube 10 and has a piston like relation with it, being rather loose in this relation. I have indicated a hollow cylinder 33 which may be of glass, or rubber, or other non-corrosive material. A guiding spindle or wire 34 is carried by the air float 33 and on the spindle or guide 34 is a valve member, such as a thin and flexible rubber washer 35. which seats against a flared end 36 of tube 30. The bottom of the hydrometer tubes are suitably plugged by stoppers 37 carrying tubes 38 for connection with the liquid supplying tubes 14, 15 and 16. When the hydrometer float is at rest on the bottom of the hydrometer tube, the air float 33 rests on top of the spindle 32 and the guide or wire 34 enters the tube 30.

In operation the degree of vacuum which is applied may be controlled both by the speed of the engine and the adjustment of valve 22. When a proper degree of suction is applied liquid is drawn from the battery into the glasses. The light air float 33 has a tendency to rise because of the withdrawal of air. When liquid reaches the test float the float begins to wobble because of the elevating effect of the acid or the movement of the acid in the tube. The air-float resting upon the test float is also moved and may be given an upward impulse. The disturbance of the air float in this way causes it to be raised and to seal off the tube 30. The natural weight of the air float is overcome by the conditions which may be made to obtain within the hydrometer, and once the float valve has been raised to seal off the suction it is held in place until the suction is destroyed or lessened to the proper releasing point. The sealing of the suction prevents the further rise of acid and the liquid level is left in a predetermined zone suitable for making the required observation on the gravity of the acid.

Although I have described the part 33 as an air-float, I consider that it is functionally a valve member, and desire it to be understood that means other than the described construction may be employed to effect operation of the valve by the rise of liquid.

In the drawings it will be observed that in proper operation with the battery and the device in normal condition, all three hydrometers should operate together. In the drawings tube 12 is shown full, and tube 11 is empty. In order that the device may be workable when some unusual condition is present, such for example, as a broken tube 15, a valve may be provided in the system of each hydrometer, such as the valve 40 located in the liquid supplying tube.

It is of course to be understood that modifications in use and in structure may be made without departing from the spirit and scope of this invention as expressed in the appended claims.

I claim:

1. In a hydrometer having a hydrometer test float within a cylinder therefor, in combination, a tubular member within the top of the cylinder adapted to transmit suction to the cylinder for drawing liquid into the lower end of the cylinder, a valve seat on the hydrometer end of said tubular member within the cylinder, a free float-like member in said cylinder positioned to rest on said hydrometer float and having a bleeding piston-like relation to said cylinder, a guide pin on said float-like member normally extending into said tubular member and a valve member encircling said guide pin and cooperative with said valve seat, said float-like member being light in weight so as to be raised by the suction in cooperation with an impulse initiated by the rising hydrometer float.

2. In a hydrometer having a hydrometer test float within a cylinder therefor, in combination, a tubular member within the top of the cylinder adapted to transmit suction to the cylinder for drawing liquid into the lower end of the cylinder, a valve seat on the hydrometer end of said tubular member within the cylinder, a free float-like member in said cylinder positioned to rest on said hydrometer float and having a bleeding piston-like relation to said cylinder, a valve member carried by said float-like member and cooperative with said valve seat, said float-like member being light in weight so as to be raised by the suction in cooperation with an impulse initiated by the rising hydrometer float.

3. In a hydrometer comprising a test cylinder and test float, in combination, means to provide suction to the upper end of the cylinder, a valve at the upper end of the cylinder including a movable valve member, an air float in said cylinder carrying said valve member, said air float being in the form of a light weight piston having an air bleeding relation with said cylinder and being positioned in the cylinder above the test float.

4. In a hydrometer comprising a test cylinder and test float, in combination, means to provide suction to the upper end of the cylinder, a valve at the upper end of the cylinder, an air float in said cylinder adapted to close said valve upon rising of the air float to the top of said cylinder, said air float being in the form of a light weight piston having an air bleeding relation with said cylinder, and being positioned in the cylinder above the test float.

In testimony whereof I have hereunto affixed my signature.

MANDEL KAHN.